Patented May 17, 1949

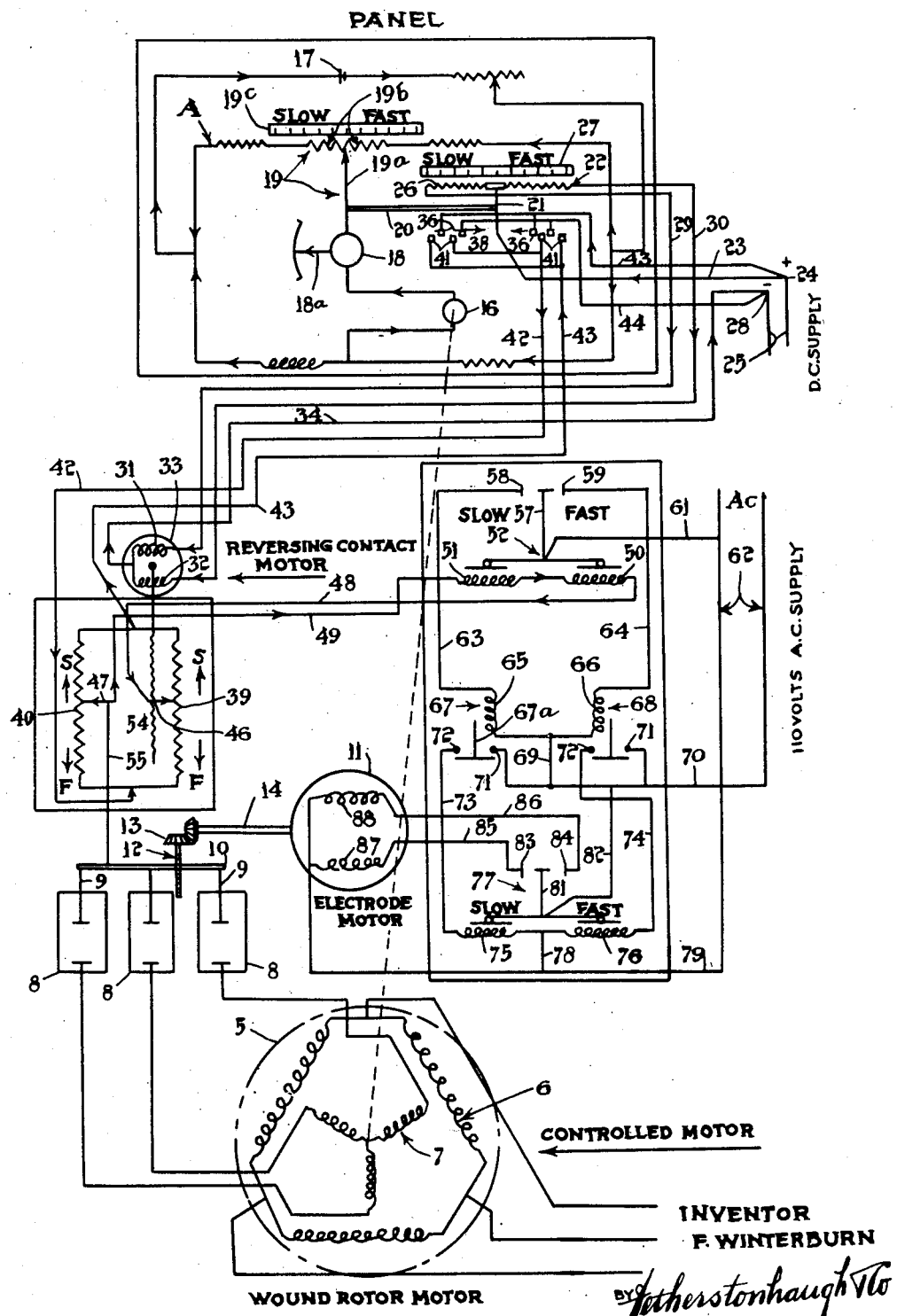

2,470,595

UNITED STATES PATENT OFFICE 2,470,595

APPARATUS FOR CONTROLLING THE SPEED OF ELECTRIC MOTORS

Fred Winterburn, Cornwall, Ontario, Canada, assignor to Howard Smith Paper Mills Limited, Montreal, Quebec, Canada Application July 9, 1945, Serial No. 603,887

7 Claims. (Cl. 318—327)

1

This invention relates to control apparatus for controlling the speed of electric motors and has particular reference to wound rotor motors. The principal object is to provide simple, reliable and relatively inexpensive speed-control apparatus which is adjustable to permit operation of the controlled motor at any pre-selected speed within a wide range of permissible speeds and which enables the pre-selected speed to be maintained substantially constant within very close limits.

Broadly speaking, the invention consists in maintaining the pre-selected operating speed of a wound rotor motor constant within close limits by automatic operation of a liquid rheostat or other variable speed-controlling resistance included in a secondary circuit of the motor. When the operating speed of the motor varies from the pre-selected speed the rheostat or other variable resistance is automatically operated to correct this condition by operating mechanism which is controlled by the speed of the motor and becomes effective when said speed varies from the pre-selected speed. In the preferred embodiment of the invention the mechanism for automatically operating the rheostat or other variable resistance is essentially a self-balancing potentiometer or Wheatstone bridge control system, the operation of which is dependent upon the voltage developed by a magneto which is driven by the motor and develops a voltage which is directly proportional to its speed.

Proceeding now to a more detailed description of this invention reference will be had to the accompanying drawings, in which the single figure is a diagrammatic view of a preferred embodiment of said invention.

Referring more particularly to the drawings, 5 designates a wound rotor motor which is controlled in accordance with my invention, the primary and secondary windings of the motor being respectively indicated at 6 and 7. A plurality of speed-controlling liquid rheostats 8 are included in the secondary circuit of the motor so that the speed of the motor may be regulated by raising or lowering the movable electrodes 9 of the liquid rheostats to increase or decrease the resistance of said secondary circuit. The several electrodes 9 are shown interconnected by a

2 common carrying bar 10 which is raised and lowered by a reversing electrode-adjusting motor 11 which is automatically controlled as hereinafter described. In the present instance carrier bar 10 is shown in screw threaded engagement with a rotary operating shaft 12 which is geared as indicated at 13 to the armature shaft 14 of motor 11. It will be understood, however, that any other suitable form of electrode-adjusting mechanism may be provided between the electrode carrier bar 10 and motor 11.

A magneto 16, the voltage of which varies directly proportional to its speed, is driven by the motor 5 through any suitable drive connection (not shown). This magneto forms part of a Wheatstone bridge circuit A in which the voltage of the magneto is balanced against the voltage of battery 17 through galvanometer 18 and slide wire 19 when motor 5 is operating at a desired pre-selected speed. The slide wire 19 is preferably calibrated in terms of revolutions per minute so that the position of slide wire contact 19a relative to calibrated scale 19c indicates the operating speed of the motor. Any increase or decrease in the speed of motor 5 will cause a corresponding change in the speed and voltage of magneto 16 and thus unbalance the Wheatstone bridge circuit A so that the resulting flow of current deflects the galvanometer needle 18a from its neutral position. The movable contact 19a of the slide wire 19 is connected so that the operation of galvanometer 18 causes it to move along the slide wire resistor 19b to such a position that a state of balance will again be indicated by the galvanometer.

Slide wire contact 19a is connected, by insulating bar 20, to the slide wire contact 21 of a second slide wire 22. Slide wire contact 21 is connected, by conductor 23, to the positive terminal 24 of a direct current supply source 25. When the Wheatstone bridge circuit A is balanced at the operating speed selected for motor 5, the slide wire contact 21 remains in a neutral position between the sections 26 and 27 of slide wire 22. These resistor sections 26 and 27 of slide wire 22 are hereinafter referred to as the slow and fast sections and are connected to the negative terminal 28 of direct current source 25 through conductors 29 and 30, operating windings 31 and 32 of reversing motor 33, and conductor 34. Any change in the speed of motor 5 resulting in movement of slide wire contact 19a from its normal position also causes a corresponding movement of slide wire contact 21 in the same direction to a position in which one of the operating windings of reversing motor 33 is energized by the direct current source 25 to operate the reversing motor in a direction dependent upon the direction of movement of slide wire contact 21.

Slide wire contact 21 also serves as a switch operating element controlling the closing of the movable contacts 36 of a normally open reversing 2-pole switch 38 through which resistors 39 and 40 are reversibly connected, in parallel, across the positive and negative terminals of direct current source 25. In this connection it will be noted that resistors 39 and 40 are suitably connected to the stationary contacts 41 of each pole of switch 38 by conductors 42 and 43 and that the movable contacts 36 of each pole of said switch are suitably connected by conductors 43 and 44 to the terminals 24 and 28 of direct current source 25. Resistors 39 and 40 are respectively traversed by movable contacts 46 and 47 which are connected, by conductors 48 and 49, to the directional operating coils 50 and 51 of a directional bridge-relay 52. Contact 46 is moved along resistor 39 by the reversing motor 33 to which said contact is mechanically connected in any suitable manner. In the present instance I have shown contact 46 in screw threaded engagement with a motor driven operating shaft 54 but it will be understood that this showing is merely intended as a symbol of a suitable form of operating connection between contact 46 and reversing motor 33. The contact 47 is moved along resistor 40 by the liquid rheostat electrode carrying bar 10 to which contact 47 is mechanically connected as indicated at 55.

When motor 5 is operating at the desired preselected speed the contacts 46 and 47 are positioned along the slide wires 39 and 40 so that there is no difference of potential between these contacts. Consequently, the bridge-relay circuit comprising resistors 39 and 40, contacts 46 and 47 and bridge-relay operating coils 50 and 51 is balanced so that no current flows in this circuit and the relay coils 50 and 51 are deenergized so that movable contact 57 of relay 52 remains in its neutral open-circuit position midway between the cooperating stationary relay contacts 58 and 59.

When contact 46 is moved along resistor 39 from its circuit balancing position by means of motor 33 the resulting change in potential between contacts 46 and 47 permits current to flow through the directional relay coils 50 and 51 of relay 52 so that the movable contact 57 of this relay is closed against one of the cooperating stationary relay contacts 58 or 59 to establish circuit connections, hereinafter described, through which alternating current is supplied to motor 11 to operate the same to raise or lower the electrodes 9 of the liquid rheostats 8. During movement of electrodes 9 the contact 47 is moved along resistor 40 in a direction to re-establish the balanced condition of the bridge-relay circuit when the operating speed of motor 5 has been restored to the normal predetermined speed by adjustment of the rheostat electrodes 9. When the normal operating speed of motor 5 is thus re-established the voltage of magneto 16 will again be balanced against the voltage of battery 17 so that galvanometer 18 and slide wire contacts 19a and 21 will be restored to their starting position.

This restoration of slide wire contact 21 to its starting position interrupts the supply of direct current to the motor 33 and also permits reopening of the previously closed movable contacts 36 of reversing switch 38 to deenergize the previously energized operating coil of relay 52 so that relay contact 57 is returned to its neutral open-circuit position to disrupt the circuit connections previously established for energizing the electrode operating motor 11 which is thus brought to rest.

The circuit connections which are established to supply operating current to electrode motor 11 may be described as follows: Movable contact 57 of relay 52 is connected by conductor 61 to one side of an alternating current source 62. The stationary contacts 58 and 59 of said relay are connected to the opposite side of said alternating current source through conductors 63 and 64, operating coils 65 and 66 of normally open relay contactors 67 and 68, and conductors 69 and 70.

The stationary contacts 71 of relay contactors 67 and 68 are connected to the alternating current source 62 by conductor 70. The remaining stationary contacts 72 of relay contactors 67 and 68 are connected to alternating current source 62 through conductors 73 and 74, operating windings 75 and 76 of motor reversing switch 77 and conductors 78 and 79.

The movable contact 81 of motor reversing switch 77 is connected to alternating current source 62 by conductors 82 and 70. The stationary contacts 83 and 84 of motor reversing switch 77 are connected to alterating current source 62 through conductors 85 and 86, windings 87 and 88 of motor 11 and conductor 79.

As conducive to a clearer understanding of this invention the following description is given of the operation of the control apparatus in the case where the operating speed of motor 5 increases above a predetermined speed which the control apparatus is initially adjusted to maintain substantially constant. For the purpose of this description it will be assumed that the control apparatus is initially set to maintain the motor 5 operating at a speed of 400 revolutions per minute. At this speed of motor 5 the magneto 16 develops a voltage of 400 millivolts which is balanced by the voltage of battery 17. As long as this condition continues slide wire contact 19a remains in its pre-set neutral position and indicates on calibrated slide wire scale 19c a speed of 400 revolutions per minute which is the speed at which motor 5 is operated. In this position of slide wire contact 19a the connected slide wire contact 21 is maintained in a neutral position between the slow and fast resistor sections 26 and 27 of slide wire 22. In this position of slide wire contact 21 the 2-pole switch 38 is open and the electrode motor 11 and reversing contact motor 33 are open-circuited. It will now be assumed that the speed of the control motor 5 increases to 405 revolutions per minute. When this occurs the magneto 16 will develop 405 millivolts which is in excess of the opposing voltage of battery 17 and unbalances Wheatstone bridge circuit A so that a current will pass through galvanometer 18 from magneto 16 and will produce a deflection of the galvanometer which causes slide wire contact 19a to move to the right along slide wire resistance 19b to re-establish a balanced condition of circuit A. This movement of slide wire contact 19a causes the connected slide wire contact 21 to move from its neutral position onto the fast resistor section 27 of slide wire 22, thereby establishing a direct current circuit through which current is supplied from direct current source 25 to motor 33 so that said motor is operated to move contact 46 along resistor 39 in the upward direction indicated by the arrow S. At the same time the movement of slide wire contact 21 to the right closes the movable contacts 36 of the right hand pole of switch 38 to connect the resistors 39 and 40 in parallel across the direct current source 25 so that, due to the variation in potential between contacts 46 and 47 resulting from the aforesaid upward movement of contact 46, current will flow through the operating coils 50 and 51 of relay 52 in the direction indicated by the arrows and will energize coil 51 to close relay contact 57 against the stationary contact 58 at the slow side of relay 52. This closure of bridge-relay 52 energizes coil 65 to close the movable contacts 67a of relay contactor 67. This closure of relay contactor 67 energizes the operating coil 75 at the slow side of motor reversing switch 77 and causes the movable contact 81 of said motor reversing switch to close against the stationary contact 83 to energize the winding 87 of electrode motor 11 which is thus operated in a direction to raise the electrodes 9 of liquid rheostats 8 to thereby increase the resistance of the secondary 6 of motor 5 to slow down motor 5 until it is again operating at the desired speed of 400 revolutions per minute. During the upward movement of electrodes 9 the electrode carrier bar 10 acts through the connection 55 to move contact 47 upwardly along resistors 40 so that the relay bridge circuit, including resistors 39 and 40, is again balanced when the speed of motor 5 is reduced to the desired operating speed of 400 revolutions per minute. The slowing down of motor 5 to its normal operating speed reduces the voltage developed by magneto 16 to 400 millivolts so that slide wire contacts 19a and 21 are restored to their starting positions. This restoration of slide wire contact 21 to its starting position deenergizes motor 33 and permits the movable contacts 36 of the right hand pole of switch 38 to return to their normal open position and thereby open-circuit the bridge relay circuit including the resistors 39 and 40 and the operating coils of relay 52. The movable contact 51 of relay 52 is thus returned to its starting position to deenergize the previously energized operating coils of relay contactor 67 and motor reversing switch 77 so that electrode motor 11 is brought to rest with the electrodes 9 in their new position.

When the speed of motor 5 falls below the predetermined normal operating speed of 400 revolutions per minute the contact 21 is moved to the left onto the resistor section 26 at the slow side of slide wire 22 and serves to close the movable contacts 36 of the left hand pole of reversing switch 38. In this case it will be clear from a study of the circuit connections shown in the drawings that motor 33 will be operated to move contact 46 downwardly along resistor 39 and that the operating winding 87a of electrode motor 11 will be energized to operate said motor in a direction to lower the electrodes 9 and thereby decrease the resistance of the secondary circuit 6 of motor 5 until the speed of the motor 5 is increased to the normal operating speed of 400 revolutions per minute. In this particular instance the downward movement of electrodes 9 results in downward movement of contactor 47 along resistor 40 to reestablish the balanced condition of the relay bridge circuit when the speed of motor 5 is restored to normal.

With the control apparatus described herein it is possible to operate motor 5 at any selected speed within a wide range of speeds and to maintain the selected speed constant within relatively close limits.

Having thus described the principles of my invention and a preferred embodiment thereof, it will be understood that various modifications may be resorted to within the scope and spirit of the invention as defined by the appended claims.

I claim:

1. Apparatus for controlling the speed of a wound rotor motor having primary and secondary windings in separately supplied circuits comprising, a variable resistance in the secondary winding circuit, a magneto driven by and in direct proportion to the speed of the motor, the voltage output of the magneto being in direct proportion to its speed, a Wheatstone bridge, a battery across the input terminals of the bridge, the magneto across the output terminals of the bridge, a galvanometer in circuit with the magneto, a slide wire potentiometer means at one output terminal the movable contact of which is actuated by the galvanometer to balance the magneto output against the battery input at a preselected speed of the motor, and means responsive to the cooperative operation of the galvanometer and moving element of the potentiometer for controlling the operation of said variable resistance to adjust the motor speed and rebalance the bridge.

2. A structure as defined in claim 1 wherein, said means includes a reversible motor causing actuation of said variable resistances.

3. A structure as defined in claim 1 wherein, said means includes a reversible motor and an electrode motor cooperating to cause actuation of said variable resistances.

4. A structure as defined in claim 1 wherein, said means includes a reversible motor controlled by the cooperative operation of the galvanometer and moving element of the potentiometer, opposed variable resistances controlled by the reversible motor, an electrode motor controlled indirectly from said opposed variable resistances, and means whereby said electrode motor mechanically controls the variable resistance in the secondary winding circuit.

5. Apparatus for controlling the speed of a wound rotor motor having primary and secondary windings in separately supplied circuits comprising, liquid rheostat resistance means in the secondary winding circuit, a magneto driven by and in direct proportion to the speed of the motor, the voltage output of the magneto being in direct proportion to the speed of the magneto, a Wheatstone bridge, a battery across the input terminals of the bridge, the magneto across the output terminals of the bridge, a galvanometer in circuit with the magneto, a slide wire potentiometer means at one output terminal the movable contact of which is actuated by the galvanometer to balance the magneto output against the battery input at a preselected speed of the motor, and electrical means responsive to the cooperation of the galvanometer and the moving element of the potentiometer for controlling the mechanical operation of said rheostat resistance to adjust the motor speed and rebalance the bridge.

6. A structure as defined in claim 5 wherein, said electrical means includes the indirect control of an electrode motor which is mechanically connected to operate said rheostat resistance to adjust the motor speed and rebalance the bridge.

7. A structure as defined in claim 5 wherein, said means includes a reversible motor responsive to the cooperative operation of the galvanometer and the moving element of the potentiometer, opposed variable resistances controlled mechanically by the reversible motor, a relay arrangement in circuit with said opposed resistances, an electrode motor controlled from said relay, and mechanical means operatively linking said electrode motor with said rheostat resistance for the purpose described.

FRED WINTERBURN.

REFERENCES CITED

The following references are of record in the file of this patent:

UNITED STATES PATENTS

| Number | Name | Date |
|---|---|---|
| 1,339,930 | Henderson | May 11, 1920 |
| 1,691,101 | Winkler | Nov. 13, 1928 |
| 2,106,858 | Snyder | Feb. 1, 1938 |
| 2,113,164 | Williams | Apr. 5, 1938 |
| 2,221,612 | Schaelchlin | Nov. 12, 1940 |
| 2,246,295 | Cook | June 17, 1941 |
| 2,356,051 | Hanna et al. | Aug. 15, 1944 |